US012355863B2

United States Patent
Farrahi Moghaddam (10) Patent No.: US 12,355,863 B2
(45) Date of Patent: Jul. 8, 2025

(54) ROUND-FREE CRYPTOGRAPHIC HASHING DEVICE FOR SECURE AND LOW-LATENCY COMMUNICATIONS

(71) Applicant: Telefonaktiebolaget LM Ericsson (publ), Stockholm (SE)

(72) Inventor: Fereydoun Farrahi Moghaddam, Brossard (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 17/634,732

(22) PCT Filed: Aug. 30, 2019

(86) PCT No.: PCT/IB2019/057353
§ 371 (c)(1),
(2) Date: Feb. 11, 2022

(87) PCT Pub. No.: WO2021/038281
PCT Pub. Date: Mar. 4, 2021

(65) Prior Publication Data
US 2022/0278823 A1    Sep. 1, 2022

(51) Int. Cl.
*H04L 9/06* (2006.01)
(52) U.S. Cl.
CPC ........ *H04L 9/0643* (2013.01); *H04L 2209/12* (2013.01)
(58) Field of Classification Search
CPC .................. H04L 9/0643; H04L 2209/12
(Continued)

(56) References Cited

U.S. PATENT DOCUMENTS 4,327,985 A * 5/1982 Urushihara ............ G03B 17/18
396/283
6,334,190 B1 * 12/2001 Silverbrook ........... B41J 2/1645
713/600
(Continued)

FOREIGN PATENT DOCUMENTS

EP        1782181 B1    10/2010

OTHER PUBLICATIONS

PCT International Search Report and Written Opinion mailed Apr. 23, 2020 for International Application No. PCT/IB2019/057353, 10 pages.
(Continued)

*Primary Examiner* — Tauqir Hussain
(74) *Attorney, Agent, or Firm* — Sage Patent Group (57) ABSTRACT

A hashing circuit includes gates or combinations of gates, each being configured to asynchronously output a state value in response to a respective input to the gate or combination of gates. Each of a plurality of bit inputs is asynchronously coupled to one or more of the inputs to the gates or combinations of gates, and each of one or more of the outputted state values is asynchronously coupled to one or more inputs of other gates or combinations of gates, in combination with one or more of the bit inputs and/or one or more other outputted state values. All or some of the state values, or output bits from a logical function of all or some of the state values, or a combination of a first subset of the state values and a logical function of a second subset of state values, are provided as hash-circuit output bits.

10 Claims, 5 Drawing Sheets

(58) Field of Classification Search
USPC .......................................................... 380/28
See application file for complete search history.

(56) References Cited

U.S. PATENT DOCUMENTS

| | | | | |
|---|---|---|---|---|
| 6,745,331 | B1* | 6/2004 | Silverbrook | H04L 9/3271 |
| | | | | 347/14 |
| 7,249,108 | B1* | 7/2007 | Walmsley | B41J 3/42 |
| | | | | 713/168 |
| 8,045,706 | B2 | 10/2011 | Liu | |
| 8,359,346 | B2* | 1/2013 | Grayson | H04L 63/10 |
| | | | | 708/200 |
| 8,447,988 | B2* | 5/2013 | Alekseev | H04L 9/0643 |
| | | | | 713/180 |
| 8,452,006 | B2* | 5/2013 | Alekseev | H04L 9/0631 |
| | | | | 380/28 |
| 9,407,276 | B1* | 8/2016 | Coban | H03M 1/1009 |
| 9,529,569 | B2* | 12/2016 | Miller | G06F 7/582 |
| 9,553,881 | B2* | 1/2017 | Costantini | H04L 63/1416 |
| 9,632,782 | B2* | 4/2017 | Yap | G06F 9/3802 |
| 9,780,868 | B2* | 10/2017 | Costantini | H04L 63/1416 |
| 9,960,909 | B2* | 5/2018 | Karighattam | H04L 9/0643 |
| 10,038,550 | B2* | 7/2018 | Gopal | H04L 9/0625 |
| 10,103,738 | B2* | 10/2018 | Ek | H03L 7/18 |
| 10,110,238 | B2* | 10/2018 | Ek | H03L 7/0996 |
| 10,164,772 | B2* | 12/2018 | Ciet | H04L 9/0643 |
| 10,177,748 | B2* | 1/2019 | Bagger | H03K 21/10 |
| 10,491,377 | B2* | 11/2019 | Alakuijala | H04L 9/0643 |
| 10,790,808 | B2* | 9/2020 | Mu | H03K 3/356104 |
| 10,833,847 | B2* | 11/2020 | Wassenberg | H04L 9/0643 |
| 10,922,465 | B2* | 2/2021 | Baratam | G11C 11/40 |
| 10,944,568 | B2* | 3/2021 | Hars | H04L 9/0643 |
| 11,895,241 | B2* | 2/2024 | Schnabel | H04L 9/3239 |
| 11,895,636 | B2* | 2/2024 | Andgart | H04L 5/0048 |
| 2004/0049468 | A1* | 3/2004 | Walmsley | G06Q 20/105 |
| | | | | 705/76 |
| 2004/0260740 | A1* | 12/2004 | Liu | H04L 9/0643 |
| | | | | 708/490 |
| 2008/0107273 | A1* | 5/2008 | Munro | H04L 9/0858 |
| | | | | 380/278 |
| 2010/0278331 | A1* | 11/2010 | Walker | G06F 21/72 |
| | | | | 380/28 |
| 2012/0201373 | A1* | 8/2012 | Hua | H03K 19/21 |
| | | | | 326/52 |
| 2014/0177837 | A1* | 6/2014 | Zubairy | H04B 10/70 |
| | | | | 380/256 |
| 2017/0154924 | A1* | 6/2017 | Johnson | H03K 19/017581 |
| 2017/0345505 | A1* | 11/2017 | Noel | G11C 8/16 |
| 2017/0353185 | A1* | 12/2017 | Peterson | H03K 19/0013 |
| 2019/0050347 | A1* | 2/2019 | Bolotov | G06F 12/1408 |
| 2020/0213126 | A1* | 7/2020 | Schnabel | G07C 5/008 |
| 2020/0344084 | A1* | 10/2020 | Shribman | G06F 16/955 |
| 2020/0358805 | A1* | 11/2020 | Segal | H04L 63/1433 |
| 2020/0358858 | A1* | 11/2020 | Shribman | G06F 9/547 |

OTHER PUBLICATIONS

McLoone, M. et al., "High-Speed & Low Area Hardware Architectures of the Whirlpool Hash Function", Journal of VLSI Signal Processing, vol. 47, No. 1, Northern Ireland, UK, Nov. 13, 2006, XP019509445, 11 pages.

Hoang, A-T et al., "Pipelining a Multi-Mode SHA-384/512 Core with High Area Performance Rate", IEICE Transactions on Information & Systems, vol. E92-D, No. 10, Oct. 10, 2009, XP001553370, 9 pages.

Hannig, F. et al., "Parallelization Approaches for Hardware Accelerators-Loop Unrolling Versus Loop Partitioning", International Conference on Financial Cryptography and Data Security, Springer, Berlin, Heidelberg, Mar. 10, 2009, XP047391769, 12 pages.

Wikipedia, "Cryptographic Hash Function", web link: https://en.wikipedia.org/wiki/Cryptographic_hash_function, May 2016, 13 pages.

Wikipedia, "Comparison of Cryptographic Hash Functions", web link: https://en.wikipedia.org/wiki/Comparison_of_cryptographic_hash_functions, 5 pages.

Wikipedia, "SHA-2", National security Agency, web link: https://en.wikipedia.org/wiki/SHA-2, 2001, 8 pages.

Zhang, Y. et al., "High Performance and Low Power Hardware Implementation for Cryptographic Hash Functions", Hindawi Publishing Corporation, International Journal of Distributed Sensor Networks, vol. 2014, Article ID 736312, Mar. 2, 2014, 12 pages.

* cited by examiner

ROUND-FREE CRYPTOGRAPHIC HASHING DEVICE FOR SECURE AND LOW-LATENCY COMMUNICATIONS

CROSS-REFERENCE TO RELATED APPLICATIONS

This application is a 35 U.S.C. § 371 national stage application for International Application No. PCT/IB2019/057353, entitled "A ROUND-FREE CRYPTOGRAPHIC HASHING DEVICE FOR SECURE AND LOW-LATENCY COMMUNICATIONS", filed on Aug. 30, 2019, the disclosures and contents of which are hereby incorporated by reference in their entireties.

TECHNICAL FIELD

The present disclosure is generally related to circuits for implementing cryptographic functions and is more particularly related to fast circuits for cryptographic hash functions.

BACKGROUND

Figure 1:
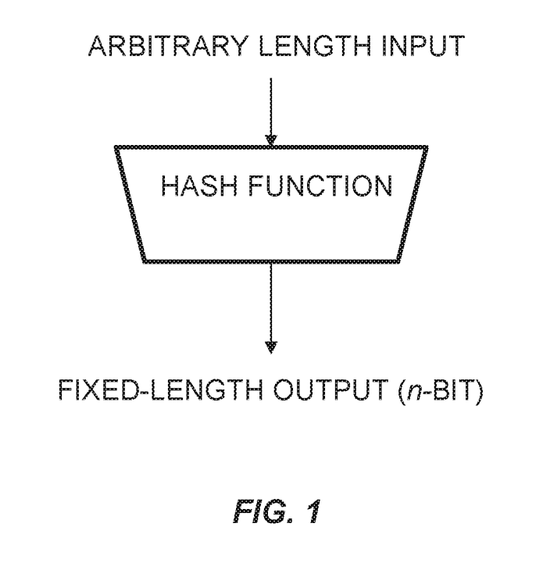
FIG. 1 is a block diagram illustrating a hash function.

A cryptographic hash function is a function with certain properties that make it useful for use in cryptography. A hash function is a mathematical algorithm that maps data of arbitrary size to a bit string of a fixed size (the 'hash value,' 'hash,' or 'message digest'). This is illustrated in FIG. 1, which shows an input of arbitrary length being mapped, with hash function h, to an n-bit, fixed-length output. A cryptographic function is a one-way function, that is, a function that, as a practical matter, cannot be inverted. By this is meant that the only way to determine the input data from the cryptographic hash function's output is to attempt a brute-force search of possible inputs to see if they produce a match or to use a "rainbow table" of previously matched hashes. By making the hash function complex enough, this search space can be so large that either of these approaches would require too many computing resources and/or too much time to make the attempt worthwhile. Cryptographic hash functions are a fundamental tool of cryptography, and are widely used in digital communications for authentication. e.g., in digital signatures and message authentic codes.

As explained by Wikipedia (en.wikipedia.org/wiki/Cryptographic_hash_function, accessed 20 Aug. 2019), the ideal cryptographic hash function has five main properties:

1. It is deterministic, so the same input message always results in the same hash.
2. It is quick to compute the hash value for any given message.
3. It is infeasible to generate an input message from its hash value except by trying all possible messages.
4. A small change to a message should change the hash value so extensively that the new hash value appears uncorrelated with the old hash value.
5. It is infeasible to find two different messages with the same hash value even though multiple input messages may in fact produce the same hash.

There are numerous hash functions suitable for use in securing digital communications. These include, for example, the widely used SHA-256 hash algorithm, which is a keyless hash function with an internal state size of 256 and which uses 64 rounds to produce its 256-bit (32-byte) output from 512-bit blocks. Several properties for this and several other hash functions are shown in Table 1.

TABLE 1

| Algorithm | Output size | Internal state size | Block size | Length size | Word size | Rounds |
|---|---|---|---|---|---|---|
| BLAKE2b | 512 | 1024 | 512 | — | 64 | 12 |
| BLAKE2s | 256 | 512 | 256 | — | 32 | 10 |
| GOST | 256 | 256 | 256 | 256 | 32 | 32 |
| HAVAL | 256/224/192/160/128 | 256 | 1,024 | 64 | 32 | 3/4/5 |
| MD2 | 128 | 384 | 128 | — | 32 | 18 |
| MD4 | 128 | 128 | 512 | 64 | 32 | 3 |
| MD5 | 128 | 128 | 512 | 64 | 32 | 64 |
| PANAMA | 256 | 8,736 | 256 | — | 32 | — |
| RadioGatún | Unlimited | 58 words | 19 words | — | 1-64 | 18 |
| RIPEMD | 128 | 128 | 512 | 64 | 32 | 48 |
| RIPEMD-128, -256 | 128/256 | 128/256 | 512 | 64 | 32 | 64 |
| RIPEMD-160 | 160 | 160 | 512 | 64 | 32 | 80 |
| RIPEMD-320 | 320 | 320 | 512 | 64 | 32 | 80 |
| SHA-0 | 160 | 160 | 512 | 64 | 32 | 80 |
| SHA-1 | 160 | 160 | 512 | 64 | 32 | 80 |
| SHA-224, -256 | 224/256 | 256 | 512 | 64 | 32 | 64 |
| SHA-384, -512, -512/224, -512/256 | 384/512/224/256 | 512 | 1,024 | 128 | 64 | 80 |
| SHA-3 | 224/256/384/512 | 1600 | 1600-2*bits | — | 64 | 24 |
| SHA3-224 | 224 | 1600 | 1152 | — | 64 | 24 |
| SHA3-256 | 256 | 1600 | 1088 | — | 64 | 24 |
| SHA3-384 | 384 | 1600 | 832 | — | 64 | 24 |
| SHA3-512 | 512 | 1600 | 576 | — | 64 | 24 |
| Tiger (2)-192/160/128 | 192/160/128 | 192 | 512 | 64 | 64 | 24 |
| Whirlpool | 512 | 512 | 512 | 256 | 8 | 10 |

Figure 2:
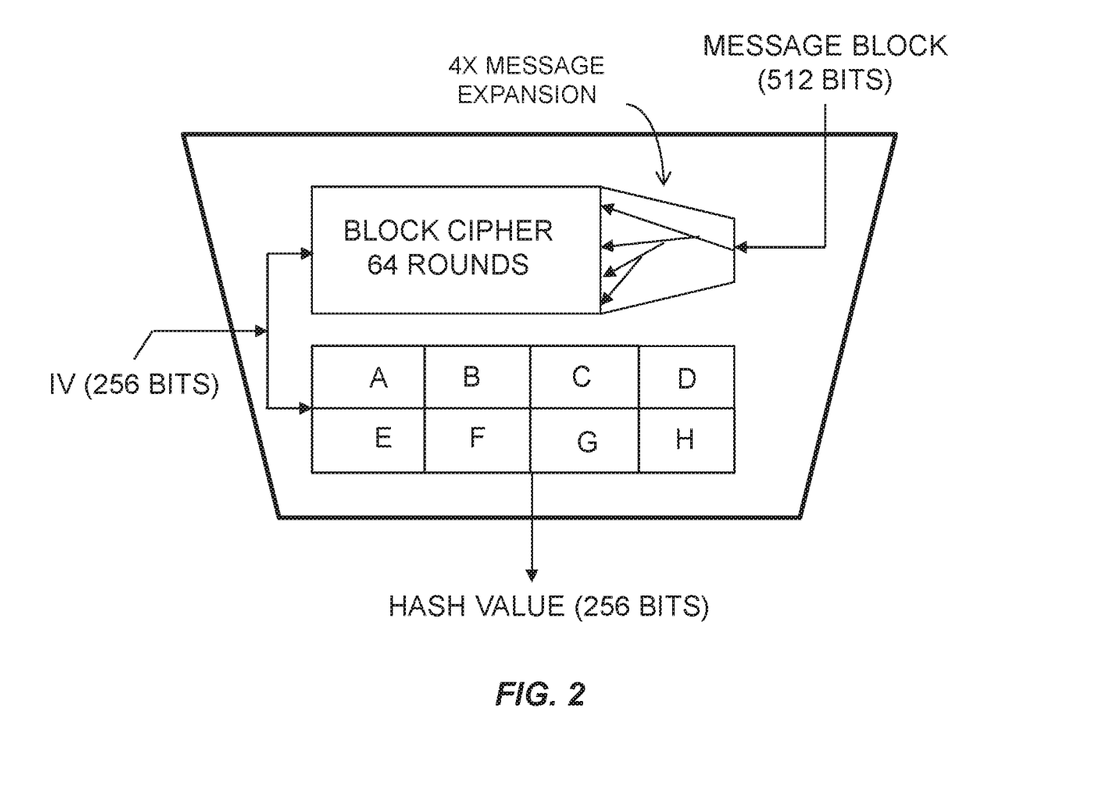
FIG. 2 shows a simplified view of the SHA-256 hash function.

The cryptographic hash functions shown in Table 1 rely on the use of multiple "rounds" of processing to ensure that the function is infeasible to invert. A "round" is a cycle of processing—a round typically takes a combination of the message input and the output of the last round as input to a mathematical hash function, which may be regarded as a data compression function. This can be seen in FIG. 2, which is a simplified block diagram illustrating the operation of the SHA-256 cryptographic function. At the core of this function is a block cipher, which is executed 64 times, for 64 rounds. At each round, the input to the block cipher is a combination of the input (the 512-bit message block) and either an initialization vector (IV), for the first round, or an output from the previous round, for subsequent rounds. By repeating this cipher, or "round," many times, i.e., 64 in the case of SHA-256, a well-designed hash function can be practically impossible to invert.

It will be appreciated, however, that these rounds, whether performed by software or with digital logic, take time, e.g., many dozens of clock cycles, and thus add latency to communications that depend on these hash functions for security. This added latency may impair the performance of, for example, wireless-based systems that depend on near-real-time communications, such as low-latency, ultra-reliable, vehicle-to-vehicle communication systems. Solutions that provide cryptographic security comparable to existing cryptographic hash functions but that can produce an output more quickly are needed.

SUMMARY

A hashing circuit comprises gates or combinations of gates, each gate or combination of gates being configured to asynchronously output a state value in response to a respective input to the gate or combination of gates. Each of a plurality of bit inputs is asynchronously coupled to one or more of the inputs to the gates or combinations of gates, and each of one or more of the outputted state values is asynchronously coupled to one or more inputs of other gates or combinations of gates, in combination with one or more of the bit inputs and/or one or more other outputted state values. All or some of the state values, or output bits from a logical function of all or some of the state values, or a combination of a first subset of the state values and a logical function of a second subset of state values, are provided as hash-circuit output bits.

DETAILED DESCRIPTION

In a typical implementation of a cryptographic hash function, whether implemented in software or with digital logic, there are generally two loops. One loop is for processing chunks of data from an input having an arbitrary length, to produce a fixed-size block for subsequent processing. The number of times this loop must be repeated depends on how large the input message is, compared to the block size utilized by the hash function. This loop cannot be eliminated, as it is important that the hash function operate on a block that is derived from the entirety of the input message.

The other loop is to implement the rounds discussed above and is necessary in a conventional implementation of a cryptographic hash function to create a mapping from the input message to the hash output that cannot be inverted in a practical manner. While each round may only require a few processing cycles in a software-based implementation or a few clock cycles in a hardware-based implementation, the cumulative effect of these rounds is that the hash operations takes many dozens, if not hundreds, of clock cycles to perform. While it is currently possible to develop hardware that can produce one or more hash outputs per clock cycle, that is done using parallel circuitry. While this approach improves hash throughput, when many hash operations are needed, it is not helpful in reducing latency in communications, because these communications require serial hash operations. For instance, in many cases it is not possible to formulate a proper reply to a received message until the received message is decrypted and verified, using a hash function. Hashing operations on the reply message can thus only begin after hashing operations on the received message are complete. Thus, parallel circuits are not effective to reduce the latency caused by the loops that implement the rounds performed in conventional hashing algorithms.

The circuits described herein provide a means to eliminate these loops, producing a cryptographic hash output from an initial input block with similar quality to conventional algorithms, but much more quickly. Notably, while the solutions described herein are hardware-based, they do not implement an algorithm, but operate asynchronously on an input data block. Consequently, they are much faster than existing hash functions, for a given number of internal states. Further, they are more secure because they are not implemented as software. This means that an attacker would need to have physical access to the circuit to launch an attack. In addition, security can be enhanced by increasing the number of internal states, which makes reversibility more complex and more time intensive. With the presently disclosed techniques, this increase in complexity can be achieved without significantly affecting the latency of the hashing operations.

As suggested in the background, there are a number of problems with existing implementations of cryptographic hash functions, when used in connection with low-latency communications. These problems include:

Speed: Because these implementations need to go through rounds of computation (in compression function), there is an unavoidable delay.

Latency: Because of the delay in the process of calculating the hash, there will be a higher latency for any communications secured by that hash function.

Length of key: While security may improve with increased length of key, the computation become more complicated as the length of the key increases.

State explosion: If the number of internal states is increased significantly, e.g., in an attempt to provide greater security, a state explosion can be expected. This will limit the free choice of number of internal states which in turn limits the securability of the function.

The circuits described herein may be used to produce a cryptographic hash, while avoiding these problems. The techniques underlying these solutions are fundamentally different from conventional implementations of cryptographic hash functions, which are algorithmic in nature and which generally involve the use of multiple rounds of processing to produce a single hash output. Unlike these conventional implementations, embodiments of the presently disclosed circuits do not implement multiple rounds of processing. Instead, the core cryptographic processing performed by these circuits is performed with asynchronous, un-clocked circuits, rather than clocked digital logic or clocked processing circuits.

For fifth-generation (5G) wireless networks and beyond, reduced latency is becoming more and more crucial. However, a fast network is only attractive to customers if and only if it is guaranteed to be secure. However, security in general and data integrity, protection, etc., in particular, each carry a price. For data integrity, as an example, hash functions play a central role. However, to make hash algorithms of the conventional sort stronger, i.e., more secure, more internal states, bits, and rounds are needed. All of this leads to more delay, which is a drawback for low-latency applications running on fast networks. The techniques and circuits described herein, on the other hand, provide for an asynchronous cryptographic hash function that can include a huge number of internal states, while avoiding corresponding increases in latency.

In the description that follows and in the attached figures, only a small number of bits and internal states are represented. This allows for a full illustration of the concepts and principles underlying these circuits. In addition, this allows for convenient simulations to demonstrate the efficacy of the techniques. It should be understood that these circuits can be extended to any desired size and level of complexity, to meet application-specific requirements for cryptographic strength. At scales that provide cryptographic strength suitable for practical applications, it will not be practical to virtualize or simulate these circuits, which enhances the provided security.

Figure 3:
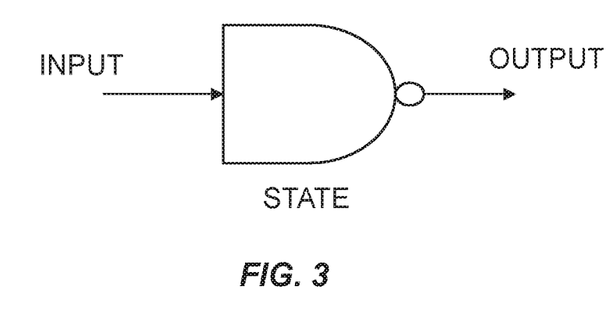
FIG. 3 illustrates an example state.

In some circuits according to the presently disclosed techniques, internal states of the cryptographic hash function are implemented using the building block illustrated in FIG. 3, which may be understood to be a NOT gate. This internal state is essentially an inverter component, where the output is determined from the input according to a function of the form:

$$\text{Output} = f(\text{Input}) = \begin{cases} 1 & \text{Input} < .5 \\ 0 & \text{Input} \geq .5 \end{cases}.$$

It will be appreciated that this is a normalized representation of the NOT gate's operation and may represent current or voltage inputs and outputs; the actual ranges of the input and output voltages and/or currents are implementation-dependent. Any circuit implementation with a transfer function of the form shown above may be used; for instance, photonic gates, which are faster than electronic gates, might be used in some implementations. Some embodiments may include logic functions other than the NOT gate discussed here.

Figure 4:
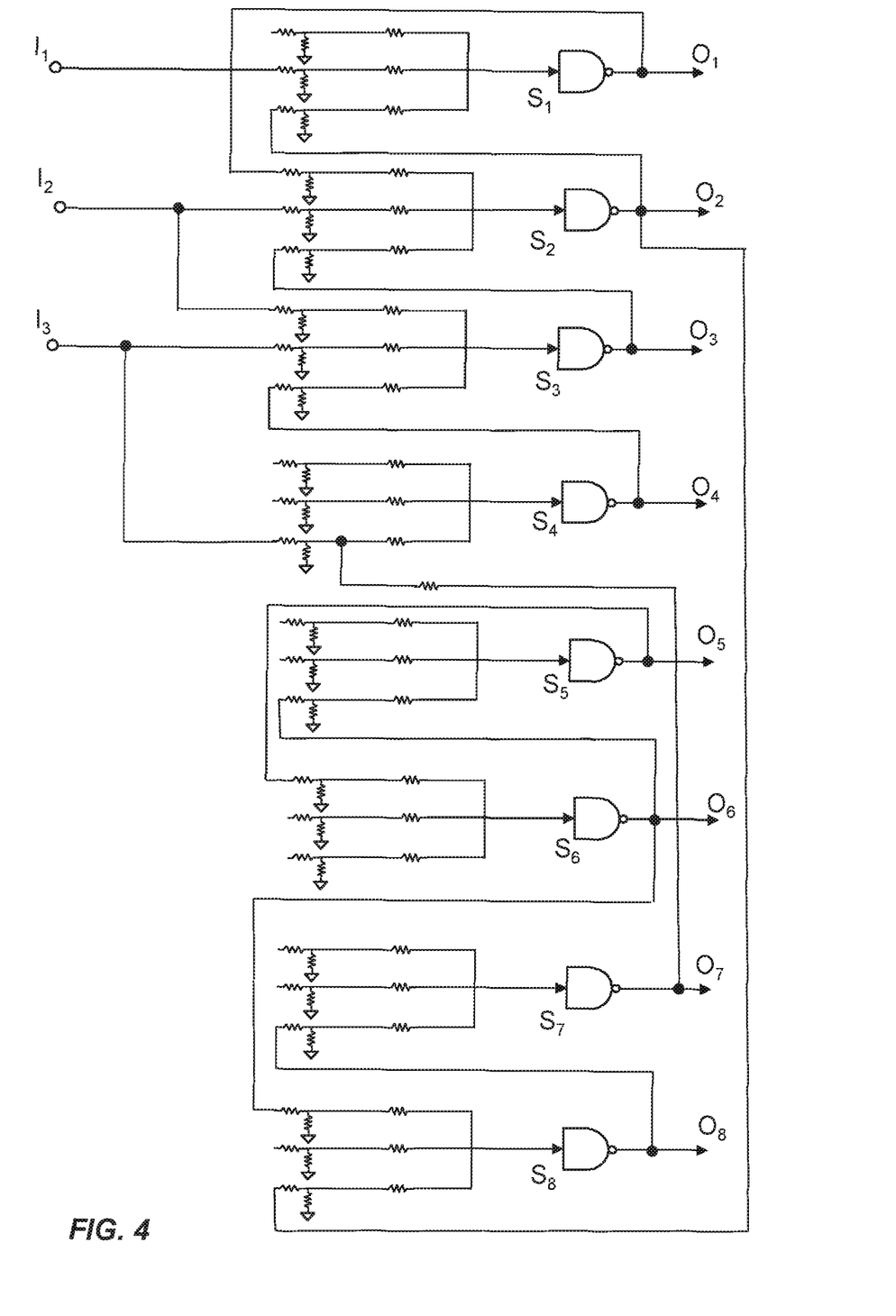
FIG. 4 is a schematic diagram illustrating an example hashing circuit.

A cryptographic hash circuit according to the presently disclosed techniques combines several of these internal states in such a manner that some state outputs are fed back and combined with message bits to provide state inputs, thus providing for the implementation of a set of non-linear equations that cannot readily be inverted. FIG. 4 illustrates an example of such a circuit with 8 internal states S1-S8, with corresponding state outputs $O_1, O_2, \ldots O_8$. As illustrated, this circuit has three external input bits, $I_1, I_2, I_3$. Again, this example circuit is merely illustrative; practical implementations will include many more states (e.g., 128 or greater) and many more external inputs. Further, each of the internal states in this example circuit is assumed to be a simple NOT gate, having multiple inputs that are added together through a simple resistor circuit: in other circuits, each of one or more of the internal states may be implemented with a single gate or a logical combination of gates.

In the example circuit shown in FIG. 4, each of the state outputs is available as a hash output—thus, this circuit may be understood to produce an 8-bit output. In other circuits, the cryptographic hash output may be a subset of the state outputs or formed from logical combinations of all or a subset of the state outputs, or some combination of both. On the input side, conventional means can be used to transform an arbitrary-length input message into a fixed-length block for input to the cryptographic hash circuit. Note that because the costs associated with increasing the input block size are low with the circuits disclosed herein, larger inputs (i.e., inputs with a longer fixed length) can be used, which can reduce, but not necessarily eliminate, the processing and resulting latency associated with transforming the arbitrary-length input message into the fixed-length block for input to the hashing circuit.

In cryptographic hash circuits according to the presently disclosed techniques, at least some of the state outputs are fed back and used as inputs to other states, alone or in combination with one or more other state outputs and/or in combination with one or more external input bits. In the circuit shown in FIG. 4, for instance, the second state output $O_2$ is used as one of the inputs to the first internal state, while the sixth state output $O_6$ is used as an input to the fifth and eighth internal states. Additionally, some of the internal state inputs are connected to the external inputs $I_1, I_2, \ldots$. The particular connections shown in FIG. 4 are an arbitrary example, and produce the following system of non-linear equations:

$$\begin{cases} f\left(\frac{I_1 + 0 + O_2}{3}\right) - O_1 = 0 \\ f\left(\frac{I_2 + O_1 + O_3}{3}\right) - O_2 = 0 \\ f\left(\frac{I_3 + I_1 + O_4}{3}\right) - O_3 = 0 \\ f\left(\frac{(g(I_3, O_7) + 0 + 0)}{3}\right) - O_4 = 0 \\ f\left(\frac{0 + 0 + O_6}{3}\right) - O_5 = 0 \\ f\left(\frac{0 + 0 + O_5}{3}\right) - O_6 = 0 \\ f\left(\frac{0 + 0 + O_{82}}{3}\right) - O_7 = 0 \\ f\left(\frac{0 + O_2 + O_6}{3}\right) - O_8 = 0 \end{cases}$$

where $f(x)$ is the transfer function of an internal state (e.g., the "NOT" function described above, and $g(a, b)$ is, in this example, a linear combination of I3 and O7, which depends on the values of the resistors in the resistor network combining these values.

The solution to this system of equations is an NP-hard problem. As the number of internal states increases, the time complexity for solving a system of equations formed in this matter with mathematical and computational tools increases exponentially. However, a circuit implemented in this approach will settle to the solution very quickly after being connected to a power source and to the external inputs.

It will be appreciated that connecting outputs from internal states to the inputs of other internal states may create feedback loops in the systems. Feedback loops of this nature have the potential to trigger oscillations, which can prevent an output from settling. To avoid these oscillations, several approaches may be used.

First, the circuit may be designed with a high ratio of internal states to connections. This means that the number of feedback loops in the systems will be much smaller than the number of system states. For instance, if there are 100 internal states, there are 2^100 system states. This will decrease the chance of oscillation significantly.

An additional approach is to ensure that there is a solution for the system of equations implemented by the circuit. For instance, if the input and output of a NOT gate are directly connected to one another, with no other contribution to the input, there is no solution for that output and oscillation will occur. To help ensure that the system has a solution, the number of internal states may be selected so that it is significantly higher than the number of input bits. This will result in the number of possible combinational states being much larger than the number of possible combination equations utilizing the inputs, which increases the likelihood of a system solution.

Another approach may be considered as "throttle control." The circuits as described herein do not run an algorithm or compute anything in a clocked, or synchronous manner. The ultimate goal, simply, is to reach a stable output as soon as possible after providing an input. To reduce the probability of short-term or longer-term instabilities, the circuit can be operated such that the input is provided prior to providing power to the internal states. Then, the voltage supply to these internal states may be ramped up from zero to the operating voltage over a controlled timeframe, to allow the circuit to smoothly settle on the solution state. Alternatively, both the voltage supply and the input values may be ramped up simultaneously, again to allow the circuit to smoothly settle on the solution state.

Another approach is to add "trap gates" in some connections from one state to another. These trap gates act in such a way that their output, once it has changed once for a given operation (e.g., from low to high), cannot reverse itself. (These trap gates can be reset after the cryptographic hash output has settled and been obtained by whatever function is using that output.) This might be done in a systematic way—for example, the internal states might be divided into two groups, designated "north" and "south." and trap gates installed on all connections between north gate outputs and south gate inputs ("southbound" connections) while none are installed on connections between south gate outputs and north gate inputs ("northbound" connections).

Figure 5:
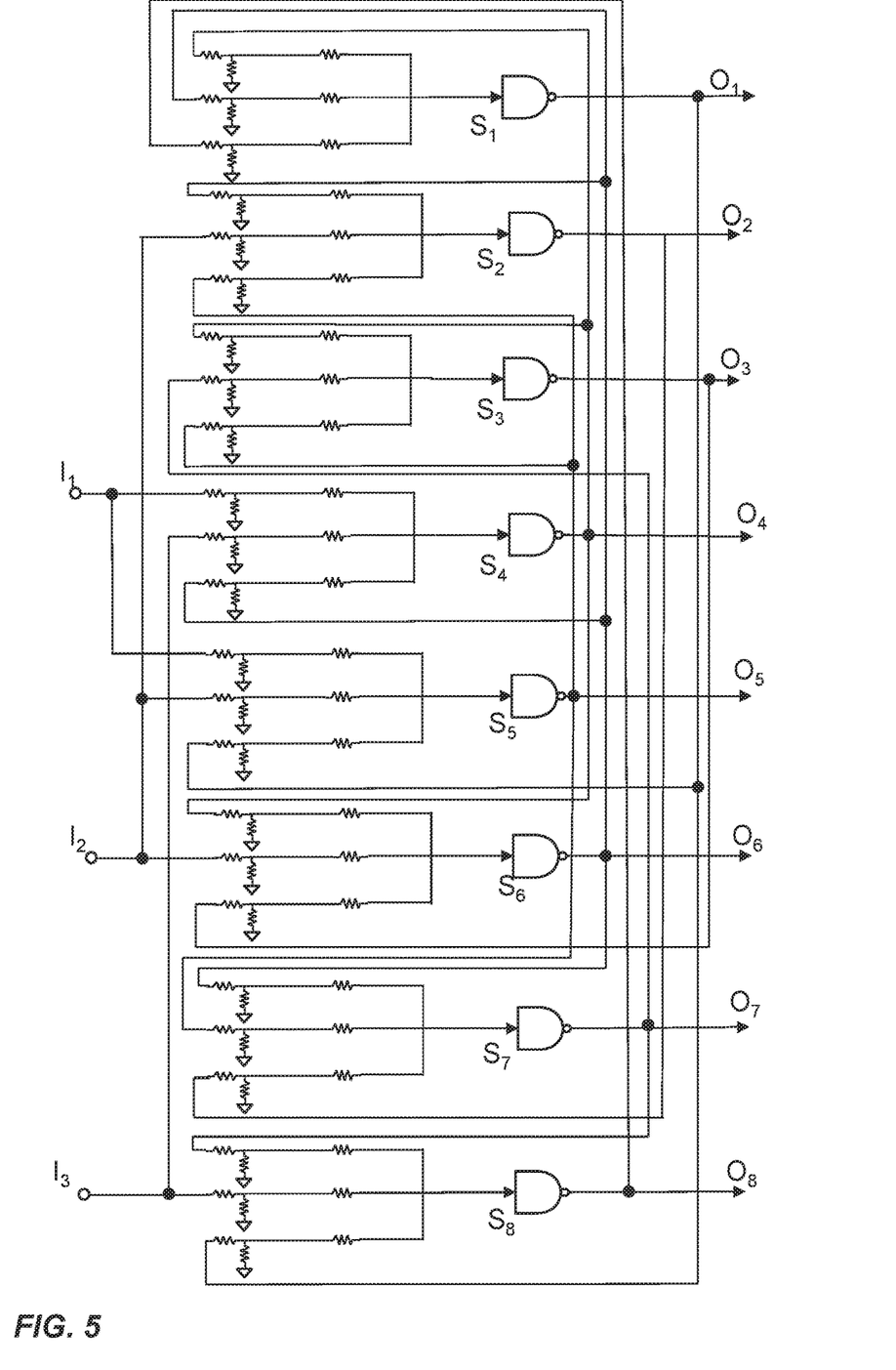
FIG. 5 is a schematic diagram illustrating another example hashing circuit.

FIG. 5 is another example of a cryptographic hash circuit according to the presently disclosed techniques. While it, like the circuit in FIG. 4, also has eight internal states and three external input bits, it has a richer set of connections, and thus implements a more complex system of non-linear equations. The output in this example is taken from only a subset of the internal states; in this case, from states $O_1$, $O_2$, and $O_3$. This circuit, which is small enough to be feasibly simulated, has been tested in a circuit emulator; a few examples of the emulated circuit outputs are shown in Table 2. In those examples, for an input of 100 the output is 001, while an input of 101 produces an output of 111, which is arbitrary enough, considering that this is a 3-bit hash function. These and the remaining results were consistent, such that no matter how many times the emulation was run, the same output was obtained.

TABLE 2

| | (all values in volts) | | | | | |
| --- | --- | --- | --- | --- | --- | --- |
| Test # | IN1 | IN2 | IN3 | OUT1 | OUT2 | OUT3 |
| 1 | 1 | 1.3e−07 | 8.83e−08 | 0.0469 | 0.0627 | 0.967 |
| 2 | 1 | 1.01e−07 | 1 | 1 | 1 | 0.97 |

Thus, the emulation overall produced consistent and apparently arbitrary outputs for different combinations of the input. This, of course, is what is desired of a cryptographic hash function. In particular, the consistency means that the same function can be implemented in separate circuits, so that multiple devices, for instance, include implementations of exactly the same hash function. This is, of course, necessary for message integrity checks and validations of digital signatures.

It will be understood, of course, that the circuits illustrated herein are not complex enough to meet the requirement that the resulting hash function be practically impossible to invert. Rather, these circuits and the simulation results described herein provide a proof-of-concept at a very small scale. For practical implementations of a hash function according to the presently disclosed techniques, the number of internal states, the number of input bits, and the number of output bits all need to be increased significantly.

It will be appreciated, then, that some embodiments of a hashing circuit according to the presently disclosed circuits and techniques will comprise a plurality of gates or combinations of gates, each gate or combination of gates being configured to asynchronously output a state value in response to a respective input to the gate or combination of gates. In this document, the term "asynchronously output" is meant to indicate that the output of the gate or combination of gates is asynchronously responsive to the input or inputs to that gate, in that there is no clocking mechanism involved.

These embodiments further comprise a plurality of bit inputs coupled to hash-circuit input bits, with each of the bit inputs being asynchronously coupled to one or more of the inputs to the gates or combinations of gates. In this document, the term "asynchronously coupled" is meant to indicate that the coupling includes no intervening synchronous, or clocked, circuit elements. As will be discussed in further detail, while the conversion from hash-circuit input bit values to bit inputs might be performed synchronously, the core of the hashing circuit operates asynchronously. Each of one or more of the state values output from the gates or combinations of gates is asynchronously coupled to one or more inputs of other gates or combinations of gates, in combination with one or more of the bit inputs and/or in combination with one or more others of the state values output from the gates or combinations of gates.

In various of these embodiments, all or a subset of the state values, or output bits from a logical function of all or a subset of the state values, or a combination of a first subset of the state values and a logical function of a second subset of state values, are provided as hash-circuit output bits. In some embodiments, the number of hash-circuit output bits may be the same as the number of internal states, while in others there may be substantially more internal states than hash-circuit output bits.

Figure 6:
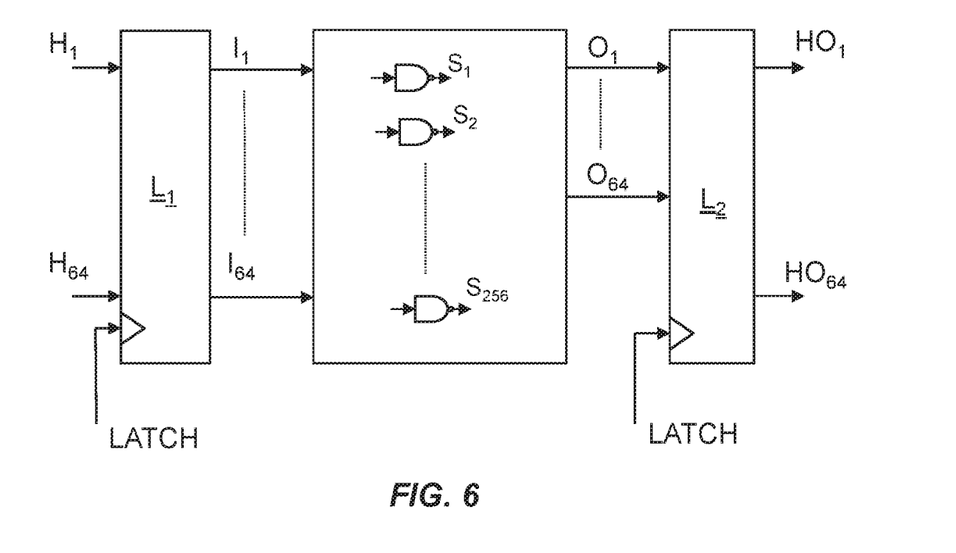
FIG. 6 is a block diagram illustrating another example of a hashing circuit.

In the discussion immediately above, a distinction is drawn between "bit inputs" and "hash-circuit input bits." "Hash-circuit input bits" refers to the bits provided to the circuit by a separate circuit or separate sub-circuit—these may be the output of a function that converts a message of arbitrary length to a fixed-length input block, for example. The term "bit inputs" refers to the values that are provided as inputs of internal states (i.e., to the inputs of the gates or combinations of gates discussed), either alone or in combination with other bit inputs and fed-back state outputs. The bit inputs are coupled to, i.e., electrically or otherwise derived from, the hash-circuit input bits. This coupling may be direct or may involve no more than a series resistor in some embodiments, as in the example circuits shown in FIG. 4 and FIG. 5. In other embodiments, the coupling may be via flip-flops or other latching circuit elements, which operate to selectively capture the hash-circuit input bit values and hold them for the duration of a hashing operation. An example of this is shown in the simplified block diagram of FIG. 6, where a latching circuit L1 couples the hash-circuit input bits H1 . . . 64 to the bit inputs I1 . . . I64, which are in turn supplied as inputs to the internal states S1 . . . S256, which are illustrated in FIG. 6 without the various interconnections. In this example circuit, a subset of the state values output from the internal states 1 . . . 256 are coupled to hash-circuit output bits HO1 . . . HO64 through latching circuit L2. In other embodiments, various ones of all or some of the state values S1 . . . 256 may be logically combined with others to produce the hash-circuit output bits. For instance, a combining circuit may utilize all 256 state values and reduce them to 64 hash-circuit output bits.

Figure 7:
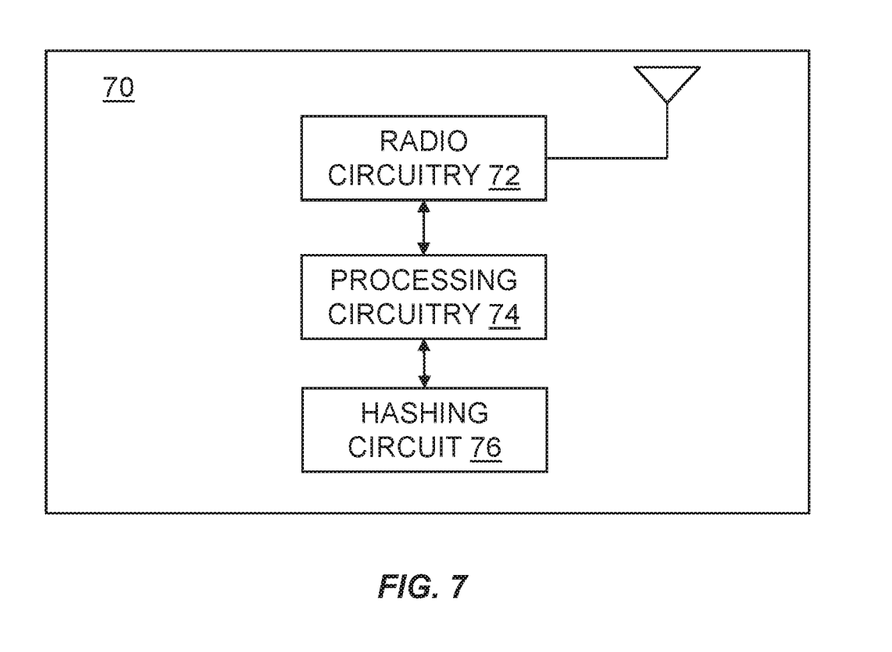
FIG. 7 is a block diagram illustrating an example wireless device.

A hashing circuit like those described above may be utilized in any of a wide variety of communication devices. FIG. 7 illustrates an example, in this case a wireless device 70, which might be a user equipment (UE) for use in a wide-area wireless communications network like an Long term Evolution (LTE) network or a fifth generation (5G) network, or a device configured for operation in a wireless local-area network (WLAN), or a machine-to-machine (M2M) communications device, etc. Wireless device 70 comprises radio circuitry 72, which is configured for wireless communication with a wireless network and/or with one or more other wireless devices. Wireless device 70 further comprises processing circuitry 74, which is configured to control radio circuitry 72 for such communications, e.g., using one or more industry standard protocols such as those developed for wide-area wireless communications by the $3^{rd}$-Generation Partnership Project (3GPP) and/or any of the 802.xx family of standards published by the Institute of Electrical and Electronics Engineers (IEEE). Processing circuitry 74 may comprise one or several microprocessors, microcontrollers, digital signal processors, and the like, coupled with one or more memory circuits, e.g., read-only memory (ROM), random access memory (RAM), and/or flash memory, with the memory circuits storing program code for execution by the microprocessors, microcontrollers, digital signal processors, etc. To facilitate and secure these communications, processing circuitry 74 may be configured, e.g., with appropriate program code, to utilize hashing circuitry 76 for performing hash operations; hashing circuitry may be configured according to any of the descriptions and examples provided herein.

As suggested above, the hashing circuits described herein provide several advantages. These circuits do not implement an algorithm with iterative "rounds," and are therefore not limited by an algorithm's computational cost and state explosion constraints. The result is that hashing operations may be performed with a lower delay, compared to state-of-the-art hash functions. These circuits can be extended to include large numbers of internal states, while maintaining low-latency performance. Likewise, the length of any keys used in the hashing circuit does not create latency issues. Consequently, these hashing circuits are particularly useful for securing 5G communications and other communications with ultra-low latency requirements.

Embodiments of the presently disclosed invention are not limited to the specific examples described and illustrated herein but include variations and extensions as described and summarized herein, and as encompassed by the claims attached hereto.

What is claimed is:

1. A hashing circuit for generating hash-circuit output bits from hash-circuit input bits, the hashing circuit comprising:
   a plurality of gates or combinations of gates, each gate or combination of gates being configured to asynchronously output a state value in response to a respective input to the gate or combination of gates; and
   a plurality of bit inputs coupled to the hash-circuit input bits,
      wherein each of the bit inputs is asynchronously coupled to one or more of the inputs to the gates or combinations of gates, wherein the asynchronously coupled bit inputs indicates that the coupling of the plurality of bit inputs includes no intervening clocked circuit elements,
      wherein each of one or more of the outputted state values is asynchronously coupled to one or more inputs of other gates or combinations of gates, in combination with one or more of the bit inputs and/or one or more other outputted state values,
      wherein all or a subset of the state values, or output bits from a logical function of all or a subset of the state values, or a combination of a first subset of the state values and a logical function of a second subset of state values, are provided as hash-circuit output bits, and
      wherein the one or more outputted state values are determined from the one or more of the inputs according to a function of the form:

$$\text{Output} = f(\text{Input}) = \begin{cases} 1 & \text{Input} < .5 \\ 0 & \text{Input} \geq .5 \end{cases}.$$

2. The hashing circuit of claim 1, wherein each of one or more of the gates is an electrical NOT gate.

3. The hashing circuit of claim 1, wherein each of one or more of the gates is a photonic gate.

4. The hashing circuit of claim 1, wherein the hashing circuit has fewer hash-circuit output bits than state values output by the gates or combinations of gates.

5. The hashing circuit of claim 1, wherein the bit inputs are coupled to the hash-circuit input bits via a latching circuit configured to selectively capture and hold values of the hash-circuit input bits during a hashing operation.

6. A wireless communication device, comprising:
   a radio circuitry configured for communication with a wireless network and/or one or more other wireless communication devices;
   a hashing circuit; and processing circuitry operatively coupled to the radio circuitry and the hashing circuit and configured to use the hashing circuit for one or more hashing operations, wherein the hashing circuit comprising:
- a plurality of gates or combinations of gates, each gate or combination of gates being configured to asynchronously output a state value in response to a respective input to the gate or combination of gates; and
- a plurality of bit inputs coupled to the hash-circuit input bits,
  - wherein each of the bit inputs is asynchronously coupled to one or more of the inputs to the gates or combinations of gates, wherein the asynchronously coupled bit inputs indicates that the coupling of the plurality of bit inputs includes no intervening clocked circuit elements,
  - wherein each of one or more of the outputted state values is asynchronously coupled to one or more inputs of other gates or combinations of gates, in combination with one or more of the bit inputs and/or one or more other outputted state values,
  - wherein all or a subset of the state values, or output bits from a logical function of all or a subset of the state values, or a combination of a first subset of the state values and a logical function of a second subset of state values, are provided as hash-circuit output bits, and
  - wherein the one or more outputted state values are determined from the one or more of the inputs according to a function of the form:

$$\text{Output} = f(\text{Input}) = \begin{Bmatrix} 1 & \text{Input} < .5 \\ 0 & \text{Input} \geq .5 \end{Bmatrix}.$$

7. The wireless communication device of claim 6, wherein each of one or more of the gates is an electrical NOT gate.

8. The wireless communication device of claim 6, wherein each of one or more of the gates is a photonic gate.

9. The wireless communication device of claim 6, wherein the hashing circuit has fewer hash-circuit output bits than state values output by the gates or combinations of gates.

10. The wireless communication device of claim 6, wherein the bit inputs are coupled to the hash-circuit input bits via a latching circuit configured to selectively capture and hold values of the hash-circuit input bits during a hashing operation.

* * * * *